March 26, 1935.    F. MEESE    1,995,715
FAUCET AND VALVE
Filed Jan. 25, 1934
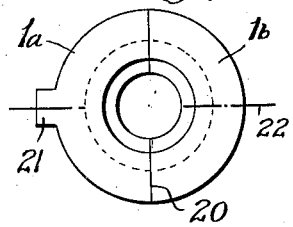
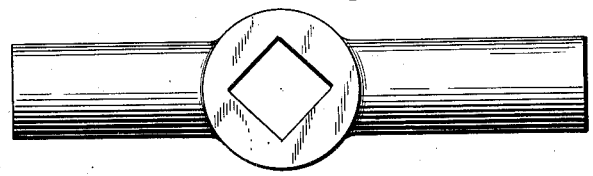
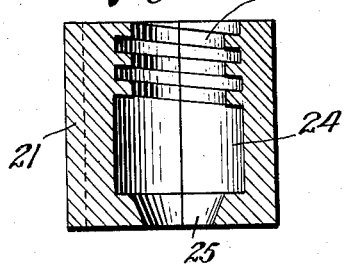
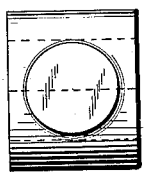
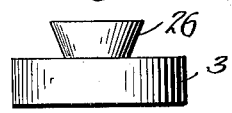
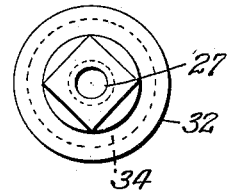
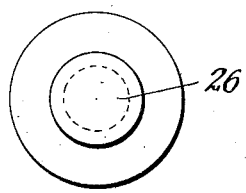
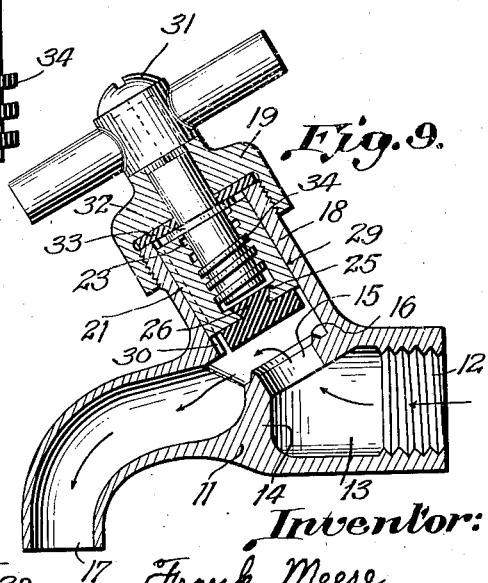
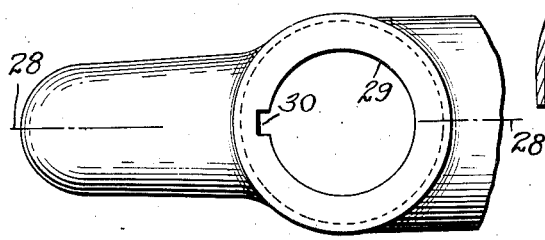
Inventor:
Frank Meese Patented Mar. 26, 1935

1,995,715

UNITED STATES PATENT OFFICE 1,995,715

FAUCET AND VALVE

Frank Meese, Chicago, Ill.

Application January 25, 1934, Serial No. 708,197

1 Claim. (Cl. 251—48)

This invention relates to a two piece valve holder for faucets and valves, by which the valve may be held without the aid of a holding screw, thus making possible quicker replacement of a worn out valve, there being no screw to remove and replace, also avoiding the corroding of the holding screw, the stripping of screw threads, and of screw breaking off in the tapped hole, and which at the same time accomplishes the closing and opening of a faucet or valve without any rotary friction between face of valve and the seat, as is the case in faucets and valves in which the valve is held by a screw to the end of a worm solid with the operating spindle, which must be rotated for the opening and closing of a faucet or valve.

In the accompanying drawing

Fig. 1 is a top plan of the valve holder.

Fig. 2 is an elevation of the holder in section.

Fig. 3 is an elevation of a valve.

Fig. 4 is a top plan of the valve.

Fig. 5 is a top view of the handle.

Fig. 6 is an end view of the handle.

Fig. 7 is an elevation of the operating spindle.

Fig. 8 is a top plan of the spindle.

Fig. 9 is a side view of a faucet, portions being in section.

Fig. 10 shows top face of the tubular extension of the faucet body.

In Fig. 9 the faucet body 11 is shown in section as cut through on line 28 in Fig. 10, and 12 is the inlet pipe connection, 13 is the inlet chamber, arrows indicating direction of the flow, 14 is a partition wall separating the inlet chamber from the outlet, 15 is an orifice through said partition wall, 16 is the valve seat or point at which control of flow takes place, 17 is the outlet, 18 is the tubular extension of the faucet or valve body for housing the mechanism by which the flow from the inlet to outlet is controlled, 19 is a cap shown in section, said cap being for closing the open end of the tubular extension 18.

The valve holder as shown in Fig. 1 is cylindrical in shape and in two halves 1a and 1b parting on line 20, and 21 is a rib on the outer cylindrical surface of the one half 1a. The two halves of the holder are shown in section in Figures 2 and 9 as cut through on line 22, and having at one end concentric with the outer cylindrical surface an internal thread 23, and at the other end a round hole formed by a tapered semicircular recess 25 in each half of the holder, the inner end of said hole being of a larger diameter than the outer end. 24 is a clearance having the same radius as the deep part of thread 23. The valve 3 is held by placing the two halves of the holder together with the semicircular recesses 25 around the valve shank 26 as shown in Fig. 9, thus the semicircular recesses are the means by which a valve may be held without the aid of a holding screw. The cylindrical surface and rib 21 of the valve holder are a close slip fit into the bore 29 and groove 30 of the tubular extension 18, the rib and groove preventing rotation of the holder. 33 is a hard fibre washer. The stem of the spindle 7 is passed through a central opening in the washer 33 and cap 19, and by means of the screw 31 and the threaded hole 27 in the top end of the spindle, the flange 32 of the spindle is drawn against the washer 33, and the bottom of handle against the outer end face of cap 19, thus eliminating end play in the spindle.

By rotating the spindle the action of the external thread 34 of the spindle upon the internal thread 23 of the valve holder will accomplish the closing or opening of the faucet or valve.

What is claimed is:

For faucets and valves a cylindrical shaped valve holder composed of two halves separating on a plane through the center of its diameter and having a longitudinal rib on its outer cylindrical surface, and at one end concentric with the outer cylindrical surface an internal thread, and at the other end also concentric with the outer cylindrical surface a round hole formed by a tapered semicircular recess in each half of the holder, whereby a valve may be held by said holder as illustrated and described.

FRANK MEESE.